United States Patent
Kolacz et al.

(10) Patent No.: US 7,147,062 B2
(45) Date of Patent: Dec. 12, 2006

(54) CABLE MANAGEMENT APPARATUS

(75) Inventors: David J. Kolacz, Plymouth, IN (US); Robert W. Steingass, Valparaiso, IN (US)

(73) Assignee: Task Force Tips, Inc., Valpariso, IN (US)

(*) Notice: Subject to any disclaimer, the term of this patent is extended or adjusted under 35 U.S.C. 154(b) by 63 days.

(21) Appl. No.: 11/090,726

(22) Filed: Mar. 25, 2005

(65) Prior Publication Data

US 2006/0214024 A1 Sep. 28, 2006

(51) Int. Cl.
*A62C 2/00* (2006.01)
*A62C 25/00* (2006.01)

(52) U.S. Cl. .............................. 169/43; 169/25; 169/51; 169/54; 169/70; 169/52; 239/69; 239/289; 239/587.2; 239/587.5; 174/47

(58) Field of Classification Search .................. 169/24, 169/25, 51, 52, 60, 70; 239/69, 263.1, 264, 239/289, 587.1, 587.2, 587.5; 242/360, 364, 242/370; 439/501; 174/47, 135; 285/272, 285/276; 901/43
See application file for complete search history.

(56) References Cited

U.S. PATENT DOCUMENTS

| | | | | |
|---|---|---|---|---|
| 2,729,295 A | * | 1/1956 | Edwards | 169/25 |
| 2,834,416 A | * | 5/1958 | Becker | 239/587.2 |
| 3,010,519 A | * | 11/1961 | Gillespie | 169/25 |
| 3,583,637 A | * | 6/1971 | Miscovich | 169/54 |
| 3,770,062 A | * | 11/1973 | Riggs | 169/24 |
| 4,535,846 A | * | 8/1985 | Gagliardo et al. | 169/25 |
| 4,923,135 A | * | 5/1990 | Schabmuller | 242/364 |
| 4,949,794 A | * | 8/1990 | Petit et al. | 169/52 |
| 4,984,745 A | * | 1/1991 | Akeel et al. | 239/587.2 |
| 5,249,632 A | * | 10/1993 | Sparling et al. | 169/52 |
| 5,735,627 A | * | 4/1998 | Nagao et al. | 901/43 |
| 5,782,504 A | * | 7/1998 | Chauncey | 285/276 |
| 6,109,360 A | * | 8/2000 | Mandzukic et al. | 169/51 |
| 6,113,343 A | * | 9/2000 | Goldenberg et al. | 239/587.2 |
| 6,308,610 B1 | * | 10/2001 | Deichmann et al. | 89/40.01 |
| 6,483,033 B1 | * | 11/2002 | Simoes et al. | 242/364 |
| 6,786,426 B1 | * | 9/2004 | Trapp | 169/52 |
| 6,811,188 B1 | * | 11/2004 | Haviland | 285/276 |
| 6,994,282 B1 | * | 2/2006 | Trapp et al. | 239/587.2 |

OTHER PUBLICATIONS

Elkhart Brass Mfg. Col, Inc, 8394-02 S *Spit-Fire® Monitor*, www.elkhartbass.com, Jun. 14, 2005, Indiana.

(Continued)

*Primary Examiner*—Steven J. Ganey
(74) *Attorney, Agent, or Firm*—Maginot, Moore & Beck LLP (57) ABSTRACT

A fire fighting monitor includes a stationary element and a rotating element for directing a water stream at variable trajectories. Electrical components, such as drive motors, are mounted on the rotating element and are connected to electrical sources remote from the monitor. A wire management system is provided for the monitor that protects the electrical wiring while accommodating relative rotation between the stationary and rotating elements of the monitor. In one embodiment, the wire management system includes a two-piece wiring skirt with a first portion connected to the stationary element and a second portion connected to the rotating element. The two portions define a circumferential channel and associated openings for passage of a wiring cable. The cable incorporates a 180° bend within the channel that travels around the channel as the cable coils and un-coils within the channels of the two portions.

21 Claims, 11 Drawing Sheets

OTHER PUBLICATIONS

Elkhart Brass Mfg. Col, Inc, 8494-01 *Sidewinder™ Remote Controlled Mini Monitor*, www.elkhartbrass.com, Jun. 14, 2005, Indiana.

Elkhart Brass Mfg. Col, Inc, 8294-04 *Scorpion® Electrically Remote Controlled Monitor*, www.elkhartbass.com, Jun. 14, 2005, Indiana.

Akron Brass, *Deckmaster™ Electric Monitor*, www.akronbrass.com/pages/product/deckmaster.html, Jun. 14, 2005, Ohio.

Akron Brass, *Streamaster™ Monitor*, www.akronbrass.com/pages/products/streammaster.html, Jun. 14, 2005.

Akron Brass, *Gemini™ Monitor*, www.akronbrass.com/pages/products/gemini.html, Jun. 14, 2005, Ohio.

Angus Fire, *Electro-Hydraulic RCMeh-80*, http://www.angusfire.co.uk, Oxfordshire, England.

Angus Fire, *Electro-Hydraulic RCMe-80*, http://www.angusfire.co.uk, Oxfordshire, England.

POK of North America, Inc., *Snake Lofty Remote Controlled Monitors*, http://www.pokfire.com, Jun. 14, 2005, Maryland.

"Energy Chain Systems® and Chainflex® Cables." IGUS® . 2002.9 pages.

* cited by examiner

CABLE MANAGEMENT APPARATUS

BACKGROUND OF THE INVENTION

The present invention relates to fire-fighting equipment, and more particularly to a monitor or water cannon that can be aimed in any direction and at any elevational angle. The invention specifically relates to a system for accommodating wiring to electrical components mounted on the rotating monitor.

In fire fighting, water cannons or monitors are used to direct a stream of water onto a specific location. Monitors can be mounted on a fire truck or on an aerial ladder assembly—anywhere that allows the monitor to accurately direct the water stream. The typical modern monitor permits adjustment of the elevational angle of the monitor nozzle to vary the distance over which the stream is directed. In addition, the monitor can be rotated in a horizontal plane so that the water stream can be precisely positioned regardless of the location and orientation of the fire truck of aerial ladder.

In many water cannons or monitors, the elevational and rotational adjustments are made manually, such as by rotating handwheels associated with the monitor. Monitors have now evolved to permit remote control of the elevational and rotational positions of the monitor nozzle. This remote control is necessary where manual operation of handwheels is problematic. A remote control monitor is particularly advantageous for a monitor mounted to an aerial ladder. Remote control allows truck mounting of a monitor at a location that would be otherwise inaccessible or hazardous to the fire fighter for manual operation.

The typical remote control system utilizes electric motors to drive gears for rotating the monitor in lieu of the handwheels. The motors are most typically powered off the vehicle electrical system, which means that electrical cables extend from the monitor to an electrical junction. In addition, many remote control systems include a control box connected to the monitor by a long electrical cable. At least some of the electrical components of the monitor are mounted on the rotating body of the monitor. Consequently, the remote control monitors require some means for providing power and communication to the rotating electrical components.

One typical means for interfacing with the rotating electrical components is through a number of electrical conducting slip rings. The slip rings maintain electrical contact between rotating components through sliding contact between a ring and brushes, or between stationary and floating contacts. One problem posed by the slip ring system is that individual slip ring arrangements are required for each electrical connection. For instance, if the monitor includes two motors and two control circuits for those motors, two slip ring arrangements are needed to provide power to each motor and two slip ring arrangements are required to provide control signals to the control circuits. Alternatively, a single power slip ring can be used to provide power to each motor.

In yet another alternative, the control signals are transmitted wirelessly, thereby eliminating the need for multiple slip rings. However, wireless transmission requires that rotating body of the monitor carry a receiver, which increases the cost and complexity of the monitor. Moreover, care must be taken to ensure that avoid interference between the monitor control transmissions and other wireless signals being transmitted at the scene of the fire. Some monitors include position sensors that provide verification of the vertical and rotational position of the monitor nozzle. The wireless approach thus requires a transmitter on the monitor, which again increases the cost and complexity of the system.

One significant drawback of the slip ring system is that the metallic conductors are prone to corrosion. This problem is exacerbated because the monitor is by its very nature used in a wet environment. Water within the slip rings not only speeds up corrosion, it also disrupts the electrical contact between the slip ring components.

A wiring system is needed for the electrical components of a rotating monitor or water cannon that eliminates these problems with the slip ring approach. This wiring system must not be compromised even by direct contact with water. In addition, the wiring system must accommodate the horizontal plane rotation between the base and rotating body of the water monitor. Most optimally, this rotation is at least 180° in either direction from a neutral position so that the water monitor can provide the maximum coverage area.

SUMMARY OF THE INVENTION

The present invention contemplates an improvement for a fire fighting water monitor having a stationary element and a rotating element for directing a water stream at variable trajectories. The monitor includes at least one electrical component, such as a motor for driving rotation of the rotating element relative to the stationary element. The electrical component is mounted to the rotating element and includes at least one wire connecting the electrical component to an electrical source independent of and remote from the monitor.

In accordance with one embodiment of the invention, this improvement comprises a wiring skirt housing an intermediate section of the wire and configured to accommodate relative rotation between the stationary and rotating elements of the monitor. The wiring skirt includes a first portion configured for mounting to the stationary element and a second portion configured for mounting to the rotating element. The first portion defines a first opening sized for passage of the intermediate section of the wire therethrough for connection to the electrical source. The second portion defines a second opening sized for passage of the intermediate section of the wire therethrough for connection to the electrical component. The first and second portions are configured to rotatably mate and are further configured to define a circumferential channel in communication with the first and second openings. The channel is sized to receive the intermediate section of the wire with the intermediate section forming a 180° bend between one portion entering the first opening and another portion exiting the second opening.

The wiring skirt preferably further comprises at least two clamps, one each for fixing the intermediate section of the wire to a corresponding one of the first portion and the second portion of the wiring skirt. The clamps are positioned on the outside of the wiring skirt immediately adjacent each of the first and second openings. The clamps fix the cable to the two wiring skirt portions so that the cable does not slip within the wiring channel in the skirt. In one feature of the invention, the clamps also help maintain the portion of the cable immediately adjacent the openings at a generally parallel orientation with respect to the upper and lower extents of the wiring channel.

In one embodiment, the first portion includes a first outer circumferential wall, a first inner circumferential wall and a first annular wall defining a first circumferential channel. The second portion includes a second outer circumferential wall, a second inner wall and a second annular wall defining a second circumferential channel. The first and second circumferential channels combine to form the circumferential channel when the first and second portions are rotatably mated. The second outer wall may define a bearing surface that rotatably engages the first outer wall when the first and second portions are mated.

In order to protect the cable within the wiring skirt from exposure to water surrounding the monitor, the second walls of the second portion are sized to overlap the first walls of the first portion when the two portions are rotatably mated. Thus, the outer wall of the second, or upper, portion has a larger diameter than the outer wall of the first, or lower, portion. Similarly, the inner wall of the second portion has a smaller diameter than the inner wall of the lower portion.

The wiring or cable is introduced into or exits the wiring skirt through the openings in first and second skirt portions. In one aspect, the outer and annular walls of the two portions define indentations into the corresponding circumferential channels. These indentations facilitate introduction of the cable into the wiring skirt generally parallel to the base of the wiring channels, which helps prevent crimping or buckling of the cable and its bend portion.

The present invention contemplates that the two skirt portions are removably connected to their corresponding stationary or rotating elements of the monitor. Thus, in one feature, the first portion includes at least two tabs projecting radially inwardly from the first inner circumferential wall for engagement with complementary notches formed in the stationary element of the monitor to mount the first portion thereon. The second skirt portion may include an indexing tab that extends into a complementary notch in the rotating element so that the second skirt portion will rotate with the rotating element.

In a further aspect of the invention, a cable management apparatus is provided for use with a fire fighting water monitor having a stationary element and a rotating element for directing a water stream at variable trajectories, the monitor having at least one electrical component mounted to the rotating element and at least one wire connecting the electrical component to an electrical source independent of the monitor. The cable management apparatus comprises a first portion connected to the stationary element of the monitor, the first portion defining a first opening for receiving a cable therethrough, and a second portion connected to the rotating element of the monitor, the second portion defining a second opening for receiving a cable therethrough. The first and second portions combine to define a circumferential channel therebetween in communication with the first and second openings.

The cable management apparatus further includes a cable containing the at least one wire, the cable entering the circumferential channel through the first opening and exiting the circumferential channel through the second opening. In one aspect of the invention, the cable defines a 180° bend between an upper portion and a lower portion of the cable, whereby the upper portion overlaps the lower portion within the circumferential channel. This bend essentially travels around the circumferential channel as the second or upper skirt portion rotates relative to the stationary first skirt portion. As the bend moves around the circumferential channel, the upper and lower portions of the cable coil and un-coil about the lower and upper skirt portions. In one embodiment, this feature of the invention allows the rotating element to rotate through a sweep of 4500 relative to the stationary element of the monitor, while the cable management apparatus keeps the electrical wiring protected and contained.

The present invention further contemplates a method for managing an electrical wire used in a fire fighting water monitor having a stationary element and a rotating element for directing a water stream at variable trajectories, the monitor including at least one electrical component mounted to the rotating element and at least one wire connecting the electrical component to an electrical source independent of the monitor. The method comprises the steps of providing a housing having a first portion connected to the stationary element and a second portion connected to the rotating element, the housing defining a circumferential channel, and passing a cable through the housing, the cable including the at least one wire, the cable defining a 180° bend within the circumferential channel. The method further contemplates that as the rotating element rotates, the cable coils within one of the first portion of the housing and the second portion of the housing and simultaneously uncoils within the other of the first and second portions of the housing.

It is one object to provide a wire or cable management apparatus for use with a fire fighting monitor that can accommodate a wide angular sweep of the rotating element of the monitor. A further object is achieved by aspects of the invention that protect the electrical wiring from water that may surround the fire fighting monitor.

One benefit of the cable management apparatus of the present invention is that it can be easily assembled on an existing fire fighting monitor or water cannon. A further benefit is that the invention maintains the integrity of the electrical connection between electrical components on the rotating element of the monitor and a remote electrical source. Other benefits and objects of the invention will become apparent upon consideration of the following written description and accompanying figures.

DESCRIPTION OF THE PREFERRED EMBODIMENT

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present invention contemplates a wiring cable management apparatus for use with a fire fighting monitor or water cannon, such as the water monitor 10 depicted in FIGS. 1–5. The monitor 10 can be of a variety of configurations capable of at least rotational adjustment in a horizontal plane (i.e., rotation about a vertical axis). For the purposes of the present disclosure, the water monitor 10 depicted in the figures is commercially available from Task Force Tips, Inc., [TFT] of Valparaiso, Indiana, as its HURRICANE RC™ monitor product. The present invention has application to other water monitors, such as the MONSOON™ product of TFT. The monitor includes an outlet elbow 12 that includes a threaded fitting 13 and stream straightener 13a at its outlet. The fitting is configured for threaded attachment of a water nozzle, such as TFT's MASTER STREAM 1250 ER™ nozzle. By way of example, this nozzle is capable of flow rates from 150–1250 gpm and pressures of 60–200 psi to achieve horizontal stream reaches ranging from 120 to 240 feet.

Figure 1:
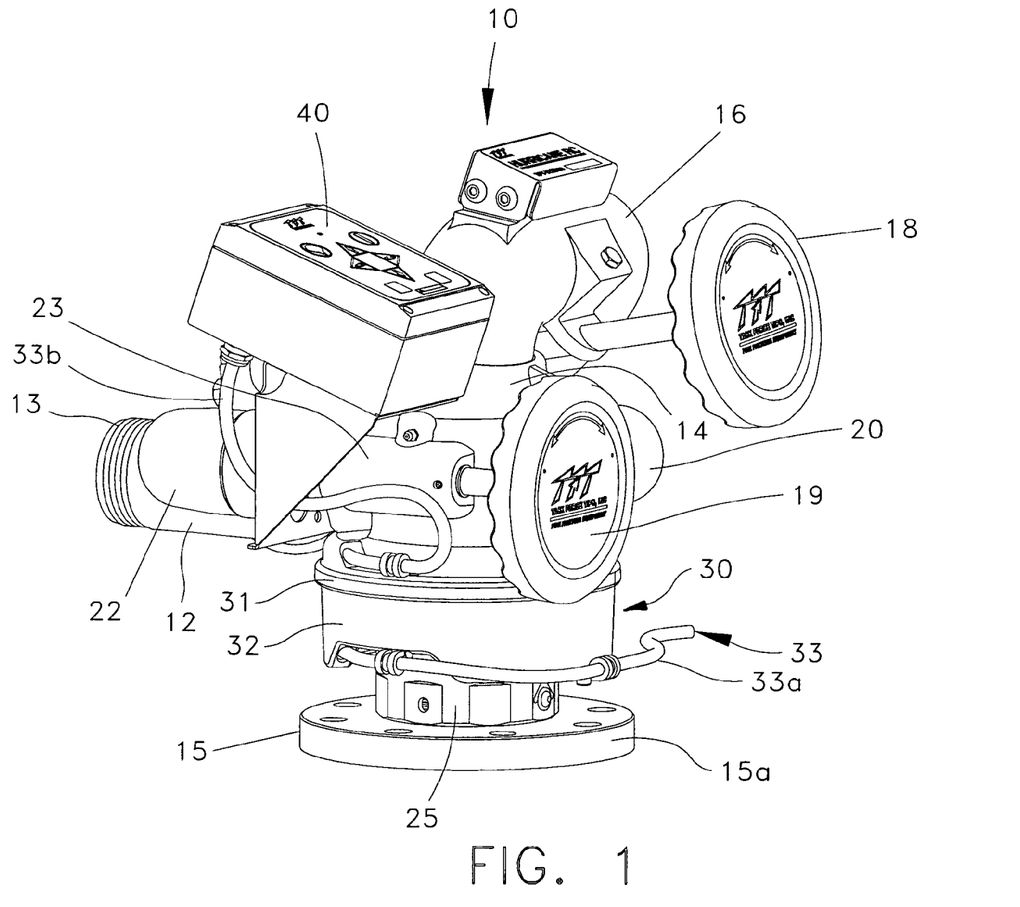
FIG. 1 is a side perspective view of a fire fighting water monitor incorporating a wiring skirt according to one embodiment of the present invention.
Figure 2:
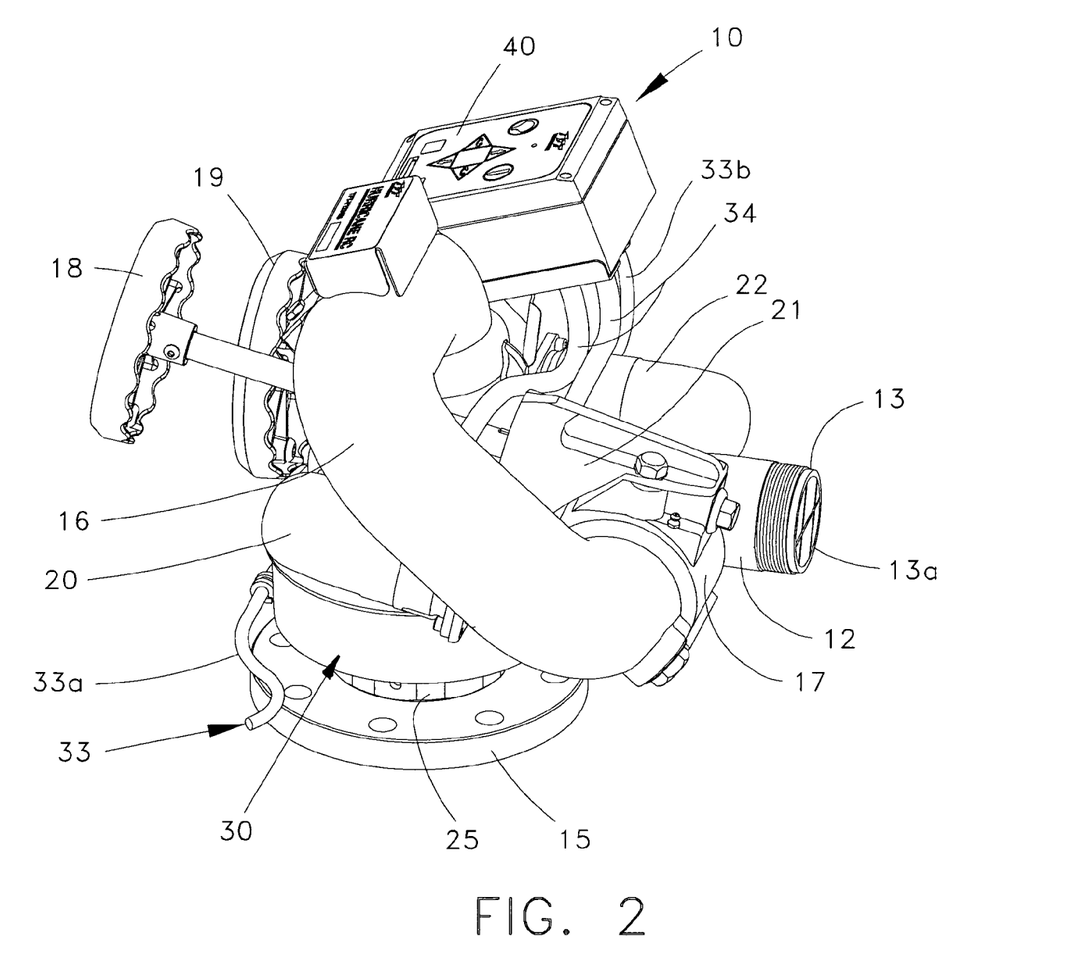
FIG. 2 is a top perspective view of the water monitor shown in FIG. 1.
Figure 3:
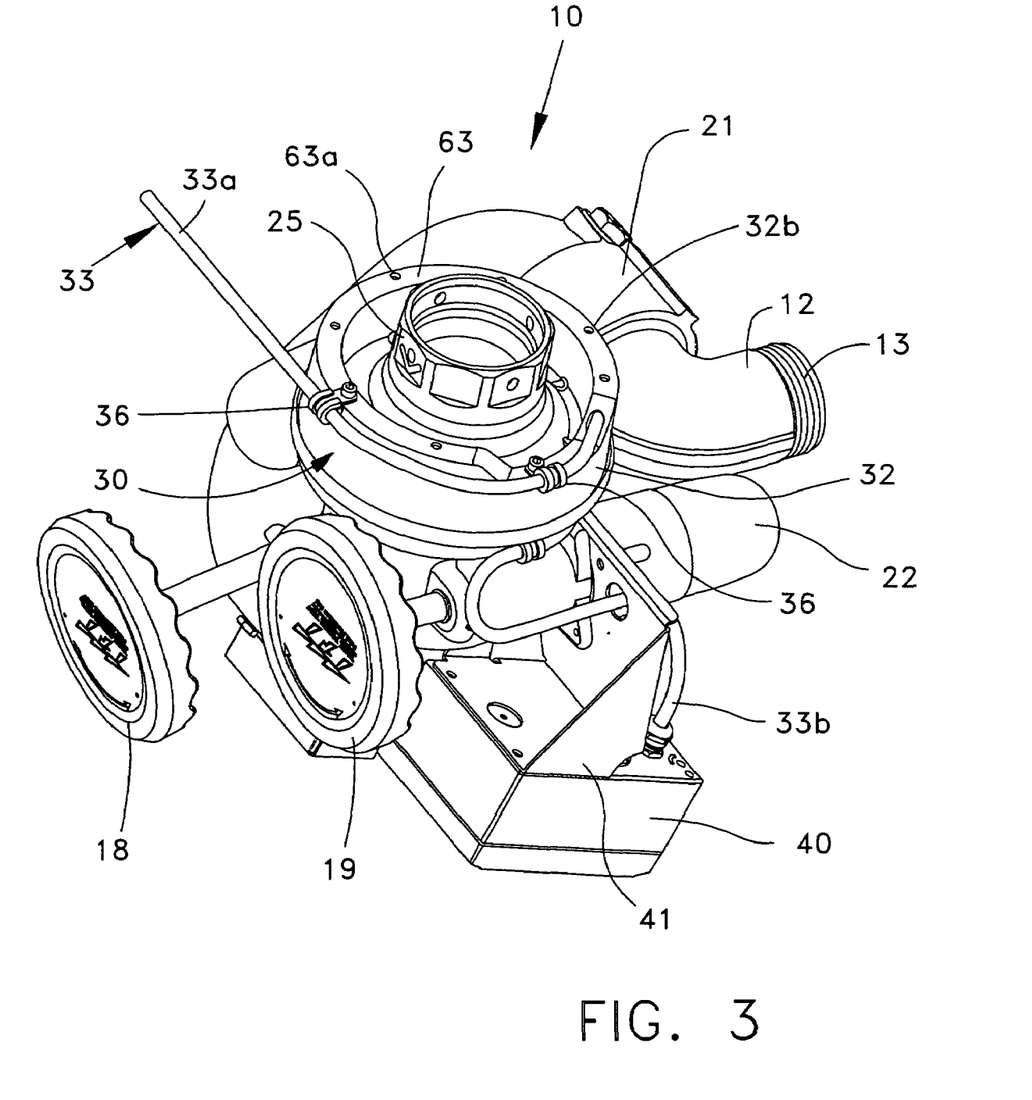
FIG. 3 is a bottom perspective view of the water monitor shown in FIG. 1.
Figure 4:
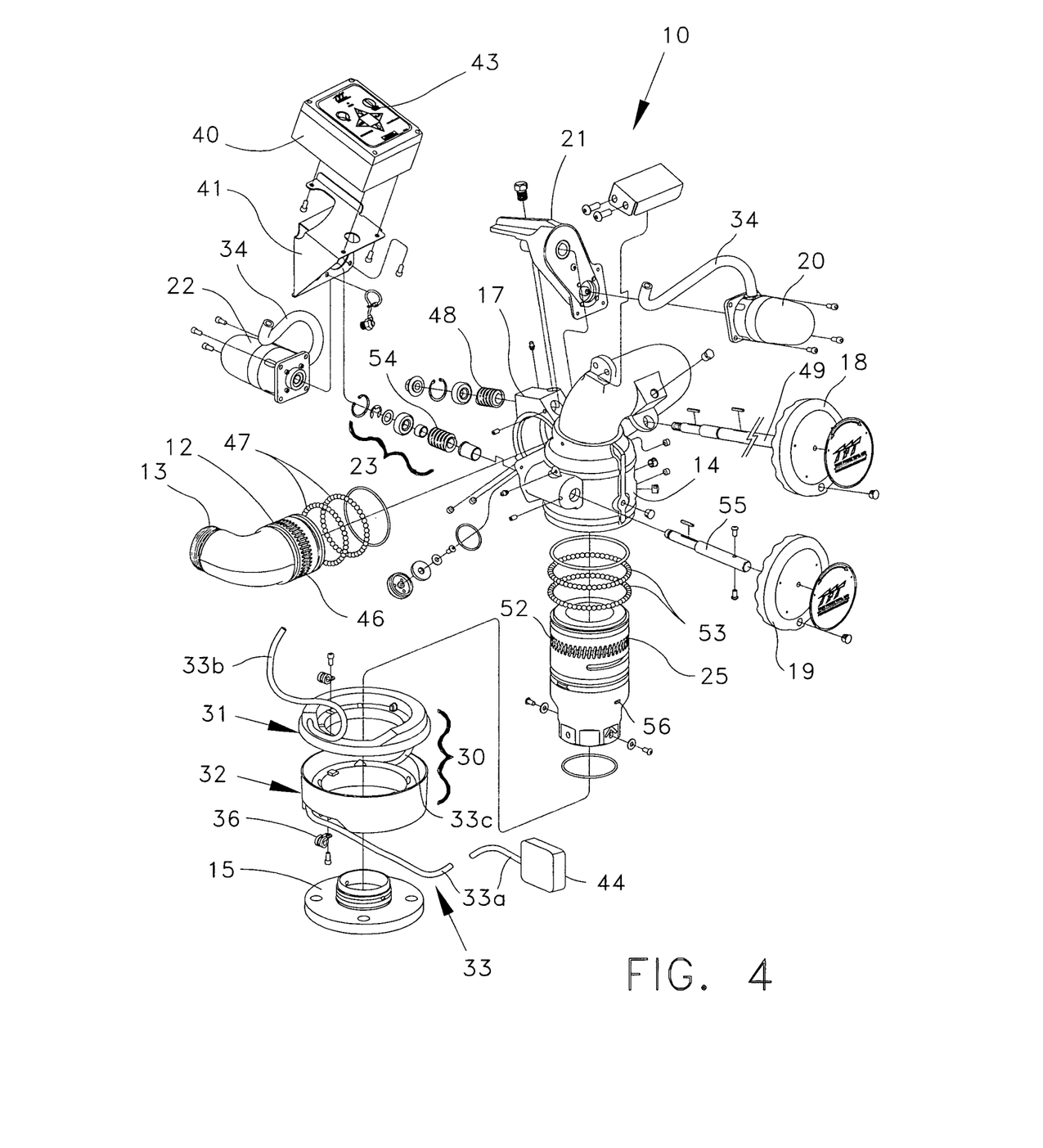
FIG. 4 is an exploded view of the water monitor shown in FIG. 1.

The outlet elbow is rotatably supported on a rotating element of the monitor, namely a monitor casing 14 (FIG. 4). The monitor casing directs inlet water flow through a big bend assembly 16 (FIG. 2) to an elbow fitting 17 upon which the outlet elbow is rotatably mounted. The casing 14 supports an elevation handwheel 18 and a rotation handwheel 19, as well as corresponding elevation and rotation motor assemblies 20, 22, respectively. The elevation handwheel 18 and motor assembly 20 are coupled through a chain drive 21 supported on the casing 14.

The rotating element or casing 14 is rotatably supported on a stationary element or support conduit 25 that is in turn fastened to an inlet flange 15. The inlet flange 15 includes a bolt pattern 15a for mounting the flange to a fire truck, aerial ladder or intermediate water supply conduit. The flange 15 and support conduit 25 must be strong enough to withstand the significant reaction forces exerted as pressurized water is discharged from the nozzle at over 50 mph.

Figure 5:
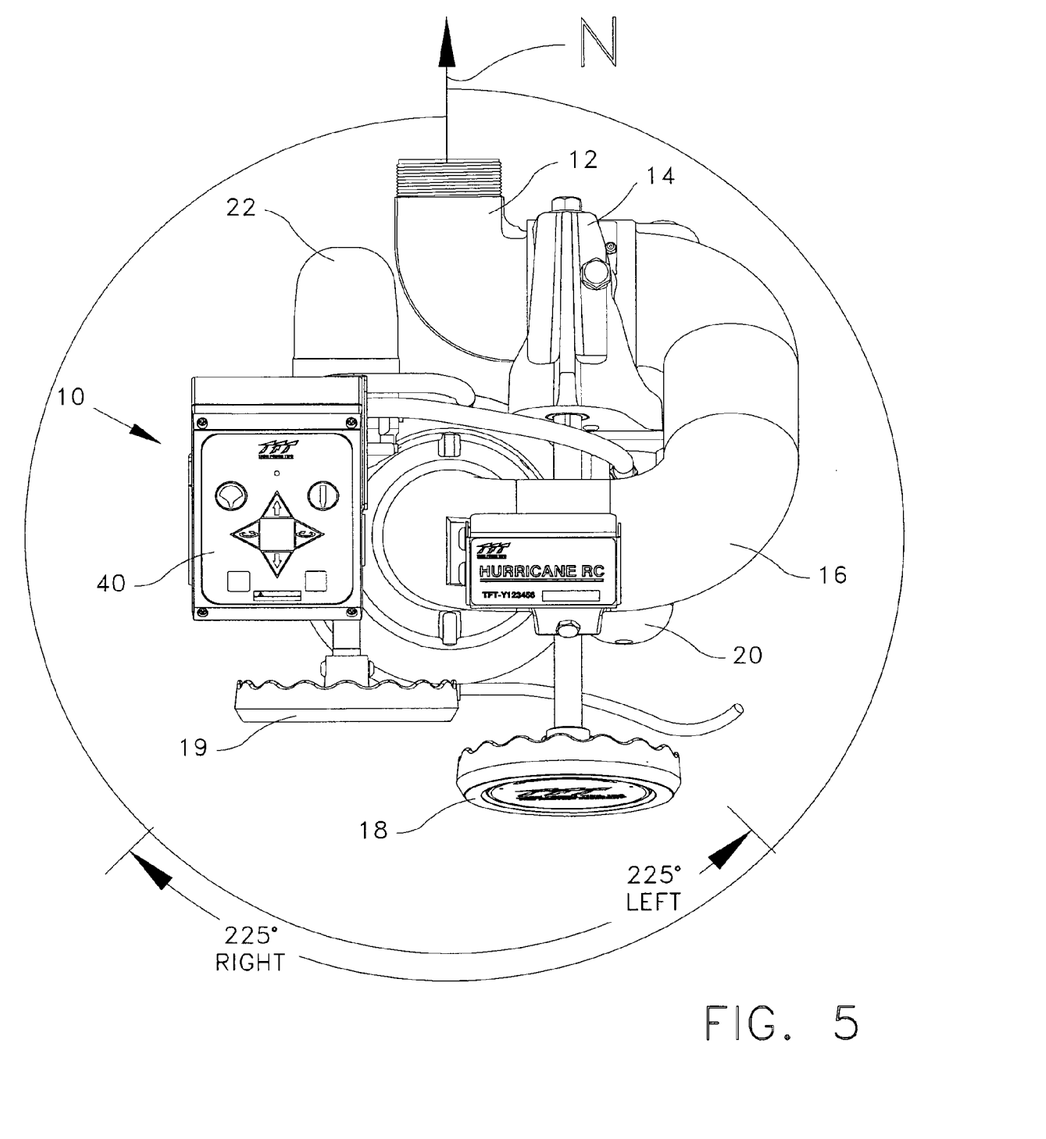
FIG. 5 is a top view of the water monitor shown in FIG. 1 depicting the range of horizontal rotation of the monitor.

The rotation handwheel 19 and rotation motor assembly 22 integrate with a rotation mechanism 23 mounted within the casing 14. The rotation mechanism 23 includes a worm gear 54 that mates with worm wheel 52 defined in the support conduit 25, as seen in FIG. 4. The worm gear is driven by a drive axle 55 that is mated at its opposite ends to the handwheel 19 and to the motor assembly 22. The casing 14 is supported on the conduit 25 through a bearing assembly 53 that permits rotation of the casing through at least 360°. In the illustrated embodiment, the water monitor is actually capable of 450° rotation −225° to the left and right from a neutral position N, as shown in FIG. 5. This amount of horizontal rotation allows the monitor 10 to provide complete coverage at a fire. The overlapping coverage from the neutral position expands the coverage area as the monitor is swept in one direction or another (left/right or clockwise/counter-clockwise from neutral).

The monitor 10 can also be adjusted in vertical angle or elevation by way of the elevation handwheel 18 or motor assembly 20. The elevation handwheel includes a drive axle 49 that mates with a worm gear 48 mounted within the elbow fitting 17. The outlet elbow 12 is rotatably mounted within the fitting through a bearing assembly 47. The worm gear 48 mates with worm wheel 46 defined in the outlet elbow 12 so that rotation of the worm gear results in rotation of the elbow about the fitting 17. The motor assembly 20 drives the axle 49 through the chain drive 21 to rotate the worm gear 48. The elevation handwheel or motor assembly is used to adjust the elevational angle of the nozzle (not shown) threaded onto the fitting 13 through 1800 for the illustrated monitor. Normally, however, the elevational angle will be varied from a 300 trajectory for a long range stream to a 750 trajectory for closer range fire fighting.

The two motor assemblies 20, 22 each include a power wire 34. Electrical power is fed through the wires 34 to the motors through a control box 40 mounted to the casing 14 by a mounting plate 41. The control box 40 may include control buttons 43 that can be used to activate either of the two motor assemblies when it is desired to change the attitude or orientation of the monitor outlet elbow 12. Thus, the control box 40 may be used simply as an alternative to manual operation of the handwheels 18, 19. Of course, this use of the control box 40 requires that the operator be in the immediate proximity to the monitor 10.

Electrical power is supplied to the control box 40 through electrical wires protected within a wiring cable 33. At a minimum, the wiring cable is connected at an end section 33a to a power supply, such as a vehicle electrical system. In the preferred embodiment, the control box 40 is connected to a remote controller 44 (FIG. 4) that can be used to remotely issue commands to the control box that in turn control the motor assemblies 20, 22. (Alternatively, the remote controller can be directly connected to the motors, thereby eliminating the control box). In the preferred embodiment, the cable 33 houses power wires (not shown) that are connected to the vehicle electrical system and separate control wires that are connected to the remote controller 44. The control wires and wiring cable can be provided in any length, such as a thirty foot length, so that the fire fighter need not be in close proximity to the water monitor during its operation.

If the wiring cable 33 is unrestrained, it risks becoming fouled within the components of the monitor as the apparatus rotates and pivots. In order to restrain and protect the cable 33, the present invention provides a cable management apparatus in the form of a wiring housing or skirt 30 that houses an intermediate section 33c of the cable (see FIGS. 4, 9). The wiring skirt 30 includes a first or upper skirt portion 31 and a second or lower portion 32 that fit together about the support conduit 25. The upper skirt portion 31 is configured to connect to and rotate with the casing 14 of the monitor, while the lower skirt portion 32 is configured to connect to and remain stationary with the support conduit 25.

Figure 6:
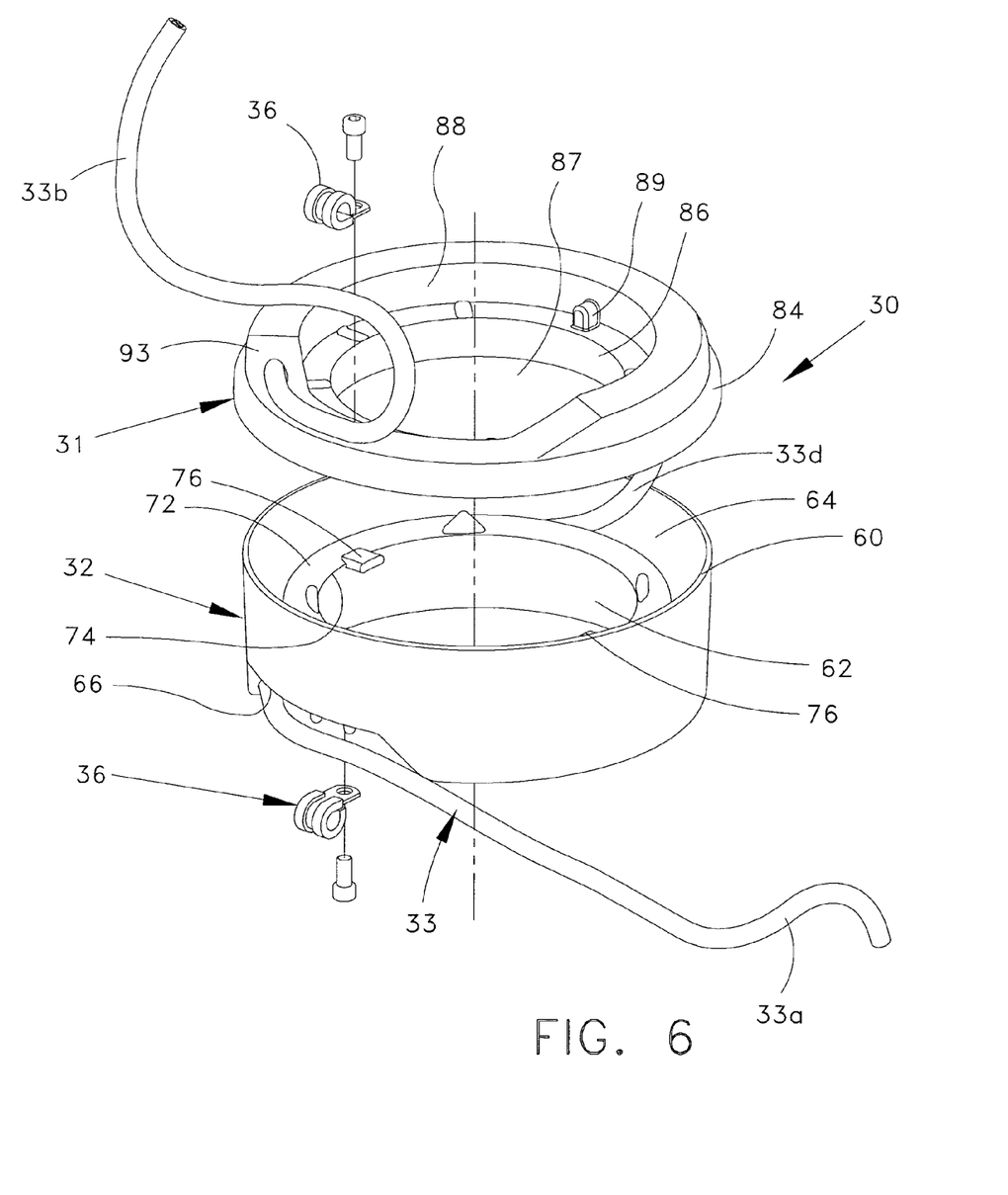
FIG. 6 is an enlarged exploded view of the wiring skirt incorporated into the water monitor shown in FIG. 1.
Figure 7:
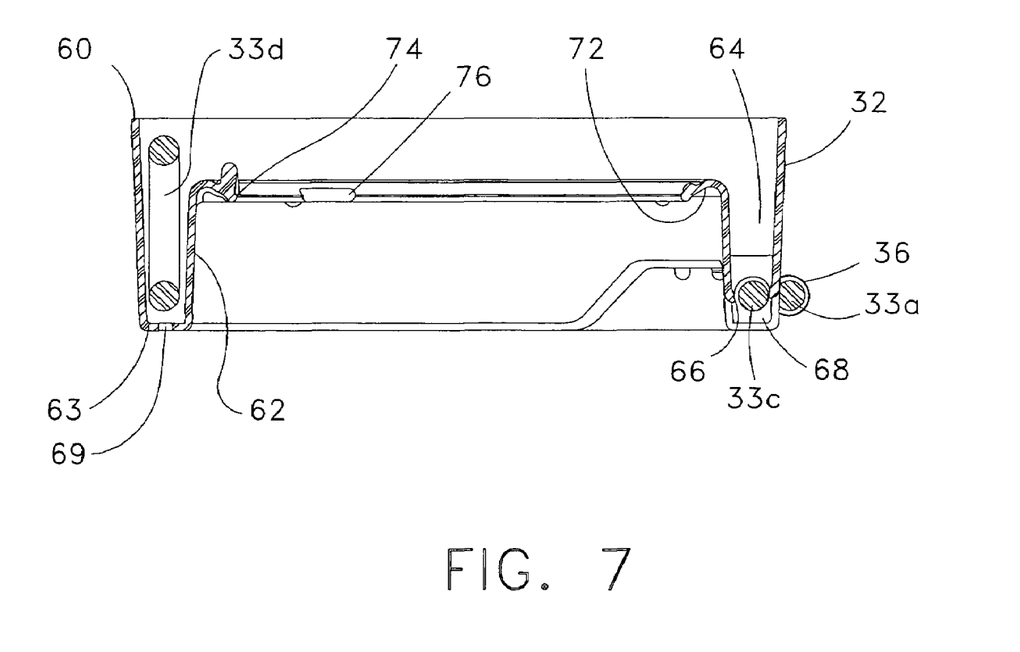
FIG. 7 is a diametrical cross-sectional view of a lower portion of the wiring skirt shown in FIG. 6.

Details of the wiring skirt can be seen with reference to FIGS. 6–11. The lower skirt portion 32 includes an outer circumferential wall 60 and an inner circumferential wall 62 offset by an annular wall 63. These walls define an annular or circumferential channel 64 sized to receive the intermediate section 33c of the cable 33. The channel 64 has a depth that allows the cable section 33c to reverse direction at a bend portion 33d (FIG. 7). As will be explained in more detail below, this bend portion 33d of the intermediate section 33c "travels" around the lower skirt portion 32 as the upper skirt portion 31 rotates relative thereto. It is this "travel" that allows the two skirt portions to accept 4500 relative rotation without crimping or bunching the cable 33.

The lower skirt portion 32 includes a radial wall 72 projecting inward from an upper edge of the inner circumferential wall 62. This radial wall 72 defines a central bore 74 that is sized to fit over the support conduit 25. A pair of retention tabs 76 (FIGS. 6–7) project inwardly from the radial wall 72. These tabs engage complementary retention notches 56 formed in the support conduit 25, as shown in FIG. 4. The retention tabs hold the lower skirt portion 32 to the support conduit so that the lower portion remains stationary while the upper skirt portion 31 rotates. While two retention tab/notch combinations are shown, additional such combinations may be provided. In the preferred embodiment, the retention tabs and notches are differently sized to force a specific position of the wiring skirt 30 relative to the support conduit. For instance, one of the retention tabs 76 and its complementary notch 56 may be wider than the other tabs and notches so that the wiring skirt can be assembled in only one orientation.

As shown in FIG. 6, the wiring cable 33 enters the lower skirt portion 32 from the underside of the lower skirt portion. In particular, the outer wall 60 and the annular wall 63 form an indentation 66 in the channel 64. This indentation 66 is provided for introduction of the cable 33 into the lower skirt portion 32. In addition, the indentation provides a mounting surface for a clamp 36 that fixes the cable to the wiring skirt. The clamp 36 is preferably a loop clamp that frictionally grips the outer sheath of the cable to prevent its movement. Additional cable clamps 36 can be affixed to the lower annular wall 63 of the lower skirt portion 31 to position the entering cable section 33*a* relative to the mounting position of the monitor 10.

Figure 9:
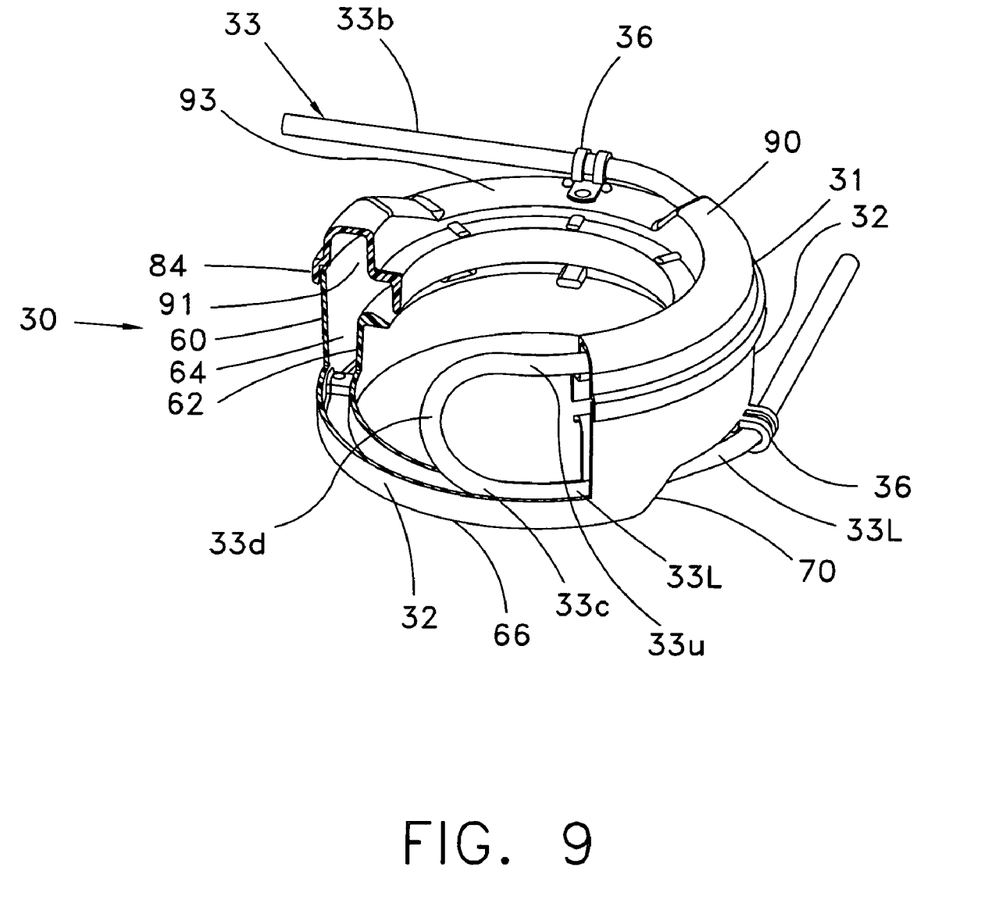
FIG. 9 is a view of the wiring skirt of FIG. 6 dismantled to show the position of the wiring cable when the wiring skirt is in its neutral position.
Figure 10:
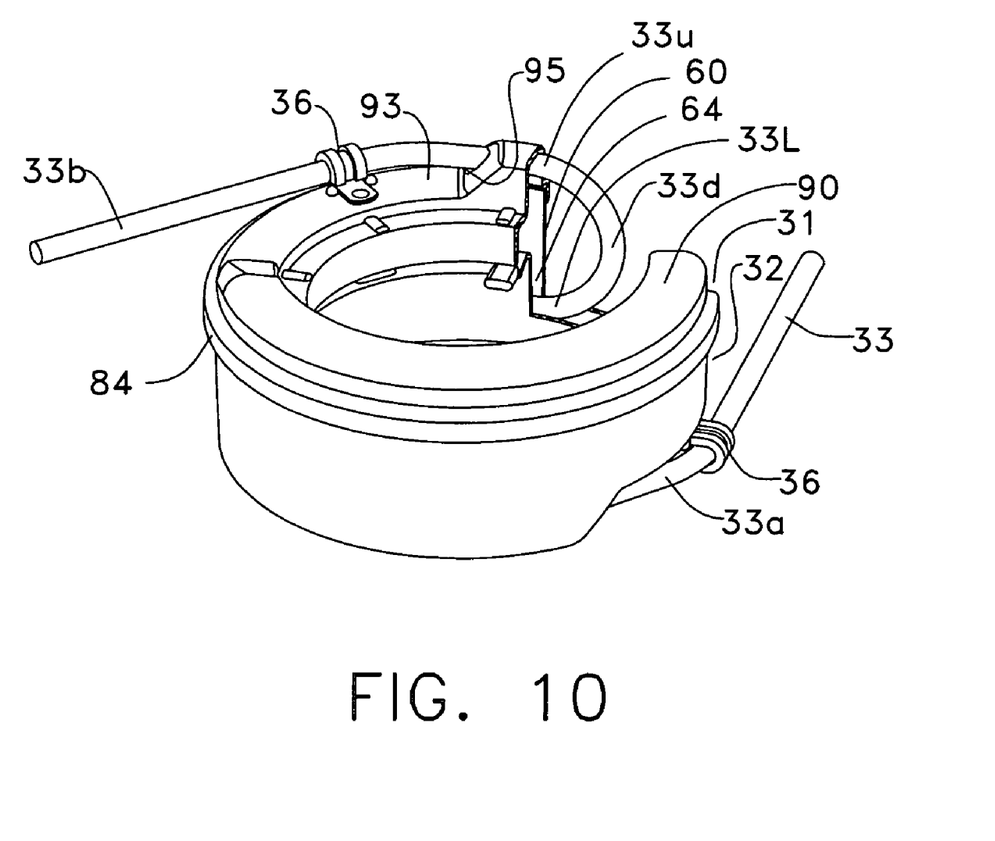
FIG. 10 is a view of the dismantled wiring skirt of FIG. 9 with the wiring skirt is in its position after full right rotation.

As shown in FIGS. 7 and 9, the indentation 66 defines an opening 68 in communication with the channel 64 so that the cable can pass through the indentation 66, through the opening 68 and directly into the channel 64 from the underside of the lower skirt portion 62. As depicted in FIGS. 6 and 10, the intermediate section 33*c* of the cable 33 coils around the circumferential channel 64 of the lower skirt portion. As explained below, this section 33*c* coils and uncoils within the channel as the upper skirt portion 31 rotates relative to the stationary lower skirt portion.

As seen in FIG. 7, the radial wall 72 of the lower skirt portion 32 is angled downward within the bore 74. Since the monitor 10 is used in a water-laden environment, it is likely that the monitor and wiring skirt will be exposed to water leakage or spray. While the wiring cable 33 may include a water-proof sheath, it is preferred that water not collect within the channel 64 of the lower skirt where it might collect and freeze onto the wiring cable. In the preferred embodiment, annular wall 63 includes a series of drain holes 69 spaced around the circumference of the wall. The downward angle of the radial wall allows water that might pass into the wiring skirt to drain toward the inlet flange 15. The radial wall 72 is sized to provide adequate clearance between the lower skirt portion 32 and the support conduit 25 to permit complete drainage of water through the wiring skirt.

Figure 8:
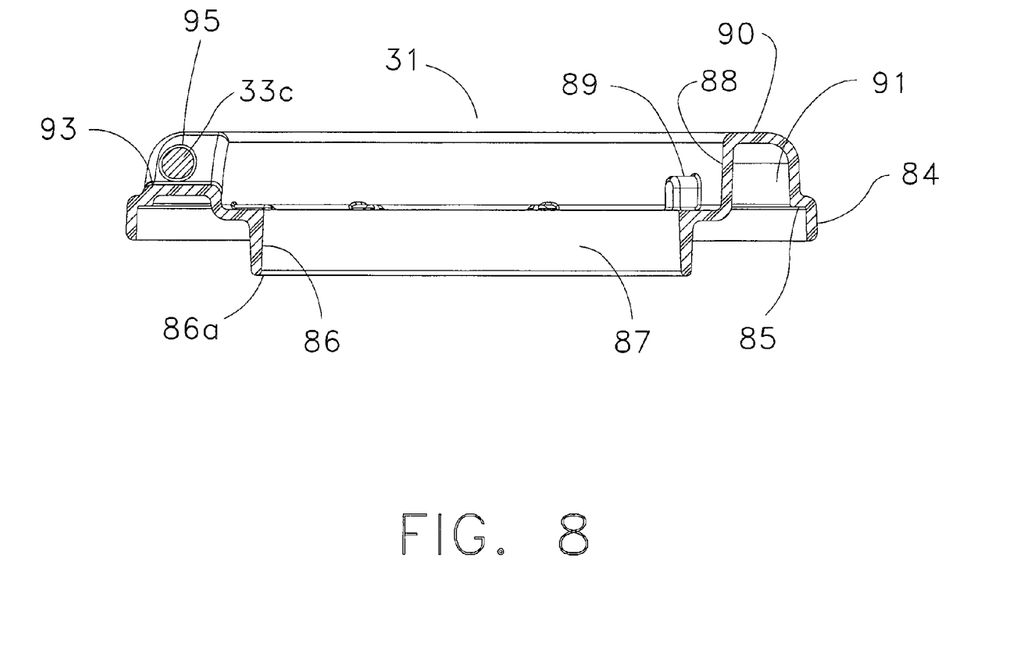
FIG. 8 is a diametrical cross-sectional view of an upper portion of the wiring skirt shown in FIG. 6.

The upper skirt portion 31 is depicted best in FIGS. 6, 8 and 9. As shown in FIG. 6, the upper skirt portion 31 fits over the stationary lower skirt portion 32 and is permitted to rotate relative to the lower portion. The upper skirt portion 31 includes an outer circumferential wall 84, a radially offset inner circumferential wall 86 and an upper annular wall 90 that combine to define an annular or circumferential wire channel 91. The outer wall 84 has a diameter slightly greater than the diameter of the outer wall 60 of the lower skirt portion 32. The inner wall 86 has a diameter that is smaller than the diameter of the bore 74 in the lower skirt portion. Preferably, the inner wall 86 of the upper skirt portion 31 has a diameter that provides a running fit with the support conduit 25 to reduce the amount of water that drains through the wiring skirt 30. These dimensions allow the upper skirt portion to fit on top of the lower skirt portion so that the channels 64, 91 combine to form a substantially enclosed circumferential channel for the wire cable. In addition, the upper skirt portion is sized to completely overlap the open face of the lower skirt portion to prevent water from entering the channel 64.

The outer wall 84 forms an in-turned bearing surface 85 that is positioned above the upper edge of the outer wall 60 of the lower skirt portion 32. The upper skirt portion 31 thus rests on the lower skirt portion 32 at this bearing surface 85. Preferably the components of the wiring skirt 30 are formed of a high density plastic or polymeric material, such as nylon, to form a low friction interface between the outer wall 60 and the bearing surface 85. The inner wall 86 of the upper skirt portion is sized so that its lower edge 86*a* is positioned just above the inner edge of the radial wall 72 of the lower skirt portion when the two skirt portions are mated.

The upper skirt portion 31 further includes a recessed inner wall 88 at the top of the skirt portion. This recessed inner wall 88 is configured for a running fit with the lower end of the casing 14 when the casing is rotatably supported on the support conduit 25. The recessed inner wall preferably incorporates at least one index tab 89 that is configured to engage a complementary notch (not shown) defined in the lower end of the casing 14. The tab 89 engages the upper skirt portion to the casing so that the skirt portion 31 rotates with the casing 14. In addition, the index tab establishes the neutral orientation of the upper skirt portion 31.

Like the lower skirt portion, the upper portion 31 includes an indentation 93 in the wiring channel 91, as best shown in FIG. 6. This indentation provides a path for the end section 33*b* of the cable as it exits the wiring skirt 30. The end section 33*b* exits the upper skirt portion through an opening 95 defined in the indentation. A cable clamp 36 can be mounted to the upper skirt portion at the indentation 93 to fix the cable end section 33*b* to the upper skirt portion.

Preferably, the depth of the opposing lower and upper wiring channels 64, 91 are sized to accommodate a 180° turn in the cable that forms the bend portion 33*d*. The combined height of the two channels is calibrated so that the cable bend portion 33*d* is not crimped within the wiring skirt 30 as the cable coils and uncoils within each skirt portion. More specifically, it is contemplated that the wiring cable 33 has a bend diameter that does not crimp the cable sheath material or otherwise compromise the cable at the bend portion 33*d*. The two channels combine when the upper and lower skirt portions are mated to form a combined channel height that is slightly greater than this optimum bend diameter. The bend diameter is dependent upon the composition of the wire cable 33. In a specific embodiment, the wire cable includes a 0.355 inch diameter polyurethane outer sheath with a minimum bend diameter of about 3 inches. Thus, the combined channel height in this specific embodiment is about 3⅛ inches. The width of the channels 64, 91 is slightly greater than the diameter of the wire cable. In the specific embodiment, the channels have a width of about ½ inch.

The indentations 66, 93, and more specifically the openings 68, 95 in the indentations, are arranged so that the cable sections 33*a*, *b* enter and exit the wiring skirt substantially parallel to the associated channels 64, 91. Thus, the openings are situated within the respective channels toward the base of the channels, as reflected in FIGS. 7–8. In addition, the cable sections 33*a*, 33*b* are clamped to the respective indentations 66, 93 to maintain this generally parallel orientation of the entering and exiting cable sections. This configuration keeps the cable from shifting within the channels, which prevents the bend portion 33d from buckling as the wiring skirt rotates.

Figure 11:
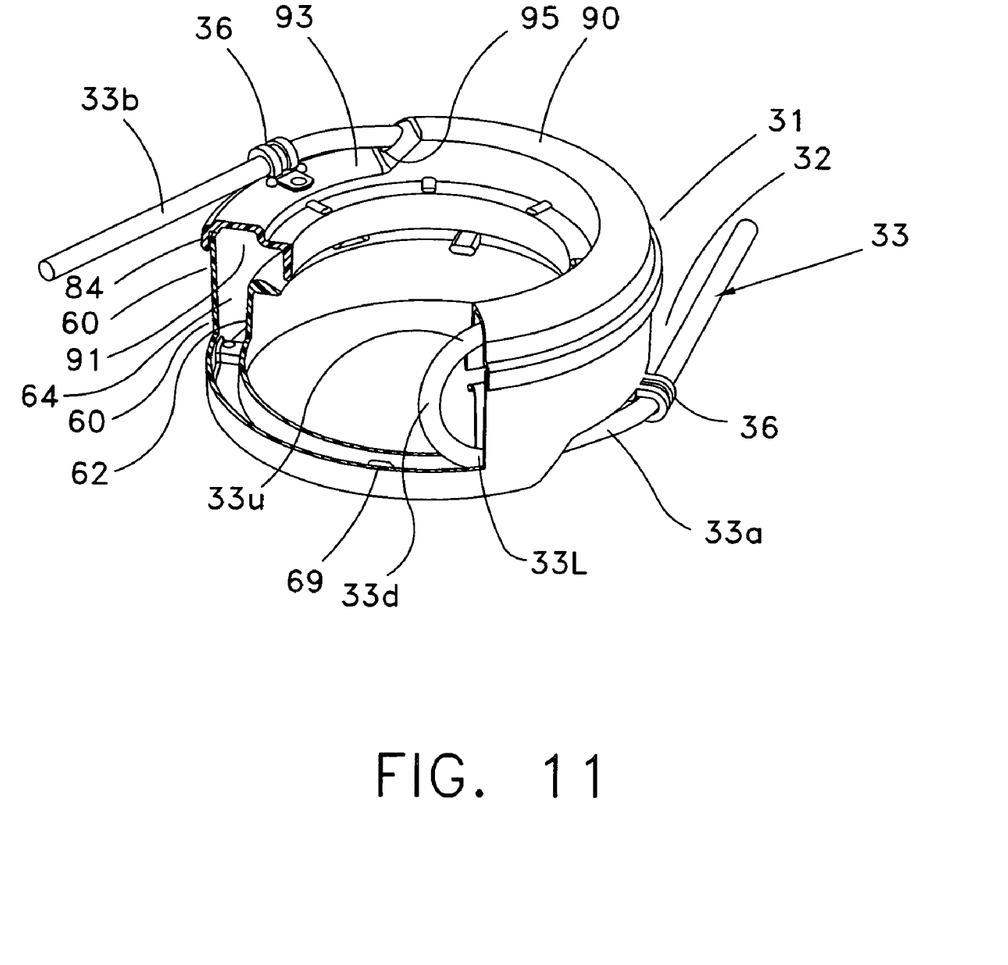
FIG. 11 is a view of the dismantled wiring skirt of FIG. 9 with the wiring skirt is in its position after full left rotation.

The intermediate section 33c and the bend portion 33d of the wiring cable 33 interact with the channels 64 and 91 in the skirt portions to allow full rotation and beyond of the upper skirt portion 31 relative to the fixed lower skirt portion 32. This interaction is depicted in FIGS. 9–11, in which the two skirt portions are opened to show the orientation of the cable 33 therein. The neutral position of the wiring skirt 30 is shown in FIG. 9. The intermediate section 33c of the cable includes a lower portion 33L that resides within the channel 64 of the lower skirt portion 32, and an upper portion 33U that resides within the channel 91 of the upper skirt portion 31. The length of these two portions 33L and 33U within their corresponding channels will vary as the bend portion 33d travels with the rotation of the upper skirt portion relative to the lower portion. In the neutral position, the lengths of the upper and lower cable portions 33L and 33U are roughly equal.

When the upper skirt portion 31 is rotated clockwise (or to the right, as depicted in FIG. 5) to its fullest angular extent, the intermediate cable section 33c will appear as seen in FIG. 10. In particular, the lower cable portion 33L substantially fills circumferential extent of the channel 64, while only a small part of the cable forms the upper cable portion 33U. In other words, most of the length of the intermediate cable section 33c is within the lower skirt portion below the bend portion 33d.

Conversely, when the upper skirt portion is rotated to its fullest counter-clockwise extent (or left rotation per FIG. 5), the majority of the intermediate cable section 33c sits above the bend portion 33d within the channel 91 of the upper skirt portion 31. Thus, the upper cable portion 33U is much longer than the lower cable portion 33L. As the upper skirt portion 31 is rotated, the bend portion 33d essentially travels along the combined wiring channels 64, 91 as the lower and upper cable portions 33L and 33U pay in or out of the respective channels 64, 91. In accordance with the present invention, the cable section 33c coils within one portion of the skirt while simultaneously uncoiling from the opposite portion of the skirt. This keeps the cable from binding while accommodating connection to a rotating element of the monitor.

The cable 33 preferably exhibits sufficient stiffness or resilience so that the bend portion 33d exerts a spreading force against the lower and upper portions 33L and 33U to push those portions into their respective lower and upper channels. This spreading or spring force is constantly exerted by the bend portion 33d even as the bend portion travels with rotation of the upper skirt portion 31. In the preferred embodiment, the cable includes a polyurethane outer sheath that exhibits the preferred stiffness. The individual wires contained within the sheath (e.g., power and communication wires) are preferably wound with TEFLON® tape and surrounded by a gel to prevent moisture from wicking into the electrical wires.

In one aspect of the invention, the bend portion 33d of the cable is not oriented in the plane of either the upper cable portion 33U or the lower cable portion 33L. In other words, the bend portion 33d is oriented substantially perpendicularly to either cable portion 33U, 33L. This arrangement allows the cable management system of the present invention to have a minimal outer diameter, which is important given the critical space considerations associated with fire fighting equipment. The bend 33d also maintains the upper and lower cable portions in substantially parallel planes relative to each other, so that friction between the cable and the skirt portions combined with the spring force generated by the bend retain the cable portions fully contained within their respective skirt portion.

Another benefit of this bend arrangement is that the upper and lower cable portions may be wound at different diameters. In other words, in an alternative configuration, the skirt has a generally conical shape, with the upper skirt portion having a larger diameter than the lower skirt portion.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

For instance, the illustrated embodiment contemplates channels 64, 91 within each skirt portion that are each deeper than the cable passing through the wiring skirt. Alternatively, the upper skirt portion 31 can include a shallower channel 91, provided that the channel is deep enough to fully receive the cable 30. On the other hand, the upper channel 91 can be deeper and the lower channel 64 shallower, provided that the combined channel height meets the limitations discussed above.

In the preferred embodiment, the wiring skirt is molded from a plastic or polymeric material. Other materials can be used provided that can endure the wet environment without corrosion. In addition, the materials preferably provide a low friction interface between the two skirt portions to accommodate the relative rotation between the portions. If necessary, a separate bearing element, such as a plastic ring, can be interposed between the bearing surface 85 of the upper skirt portion 31 and the outer wall 60 of the lower skirt portion 32.

Another feature of the preferred embodiment is that the wiring skirt 30 can be readily mounted to and removed from a water monitor as the monitor is being assembled or installed. Alternatively, the snap-fit interfaces provided by the notches 56 and tabs 76 in the lower skirt portion, or the index tab 89 in the upper skirt portion, can be replaced with a more permanent attachment, provided that the lower skirt portion 32 is held stationary and the upper skirt portion 31 is permitted to rotate with the rotating element of the water monitor.

What is claimed is:

1. In a fire fighting water monitor having a stationary element and a rotating element for directing a water stream at variable trajectories, the monitor including at least one electrical component mounted to the rotating element and at least one wire connecting the electrical component to an electrical source independent of the monitor, the improvement comprising:

a wiring skirt housing an intermediate section of the at least one wire and configured to accommodate relative rotation between the stationary and rotating elements of the monitor, said wiring skirt including;

a first portion configured for mounting to the stationary element, the first portion defining a first opening sized for passage of said intermediate section of the at least one wire therethrough for connection to the electrical source; and a second portion configured for mounting to the rotating element, the second portion defining a second opening sized for passage of said intermediate section of the at least one wire therethrough for connection to the electrical component, wherein said first and second portions are configured to rotatably mate and are further configured to define a circumferential channel in communication with said first and second openings, said channel sized to receive said intermediate section of the at least one wire with said intermediate section forming a 180° bend between one portion entering said first opening and another portion exiting said second opening.

2. The improvement of claim 1, further comprising at least two clamps, one each for fixing said intermediate section of the at least one wire to a corresponding one of said first portion and said second portion of said wiring skirt.

3. The improvement of claim 1, wherein:
said first portion includes a first outer circumferential wall, a first inner circumferential wall and a first annular wall defining a first circumferential channel; and
said second portion includes a second outer circumferential wall, a second inner wall and a second annular wall defining a second circumferential channel, wherein said first and second circumferential channels combine to form said circumferential channel when said first and second portions are rotatably mated.

4. The improvement of claim 3, wherein said second walls are sized to overlap said first walls when said first and second portions are rotatably mated.

5. The improvement of claim 3, wherein said second outer wall defines a bearing surface that rotatably engages said first outer wall when the first and second portions are mated.

6. The improvement of claim 3, wherein at least said first outer wall and said first annular wall define a first indentation into said first circumferential channel, with said first opening being defined in said indentation.

7. The improvement of claim 3, wherein at least said second outer wall and said second annular wall define a second indentation into said second circumferential channel, with said second opening being defined in said indentation.

8. The improvement of claim 3, wherein said first portion further includes a radial wall projecting inwardly from said first inner circumferential wall, said radial wall defining a central bore through which the stationary element of the monitor extends when the first portion is mounted thereon.

9. The improvement of claim 8, wherein said second inner circumferential wall is sized to fit within said central bore.

10. The improvement of claim 3, wherein said first portion includes at least two tabs projecting radially inwardly from said first inner circumferential wall for engagement with complementary notches formed in the stationary element of the monitor to mount said first portion thereon.

11. A cable management apparatus for use with a fire fighting water monitor having a stationary element and a rotating element for directing a water stream at variable trajectories, the monitor having at least one electrical component mounted to the rotating element and at least one wire connecting the electrical component to an electrical source independent of the monitor, the cable management apparatus comprising:
a first portion connectable to the stationary element of the monitor, said first portion defining a first opening for receiving a cable therethrough;
a second portion connectable to the rotating element of the monitor, said second portion defining a second opening for receiving a cable therethrough,
said first and second portions combining to define a circumferential channel therebetween in communication with said first and second openings; and
a cable containing the at least one wire, said cable entering said circumferential channel through said first opening and exiting said circumferential channel through said second opening, said cable defining a 180° bend between an upper portion and a lower portion of said cable, whereby said upper portion overlaps said lower portion within said circumferential channel.

12. The apparatus of claim 11, further comprising at least two clamps, one each for fixing said cable to a corresponding one of said first portion and said second portion.

13. The apparatus of claim 11, wherein:
said first portion includes a first outer circumferential wall, a first inner circumferential wall and a first annular wall defining a first circumferential channel; and
said second portion includes a second outer circumferential wall, a second inner wall and a second annular wall defining a second circumferential channel,
wherein said first and second circumferential channels combine to form said circumferential channel when said first and second portions are rotatably mated.

14. The apparatus of claim 13, wherein said second walls are sized to overlap said first walls when said first and second portions are rotatably mated.

15. The apparatus of claim 13, wherein said second outer wall defines a bearing surface that rotatably engages said first outer wall when the first and second portions are mated.

16. The apparatus of claim 13, wherein at least said first outer wall and said first annular wall define a first indentation into said first circumferential channel, with said first opening being defined in said indentation.

17. The apparatus of claim 13, wherein at least said second outer wall and said second annular wall define a second indentation into said second circumferential channel, with said second opening being defined in said indentation.

18. The apparatus of claim 13, wherein said first portion further includes a radial wall projecting inwardly from said first inner circumferential wall, said radial wall defining a central bore through which the stationary element of the monitor extends when the first portion is mounted thereon.

19. The apparatus of claim 18, wherein said second inner circumferential wall is sized to fit within said central bore.

20. The apparatus of claim 13, wherein said first portion includes at least two tabs projecting radially inwardly from said first inner circumferential wall for engagement with complementary notches formed in the stationary element of the monitor to mount said first portion thereon.

21. A method for managing an electrical wire used in a fire fighting water monitor having a stationary element and a rotating element for directing a water stream at variable trajectories, the monitor including at least one electrical component mounted to the rotating element and at least one wire connecting the electrical component to an electrical source independent of the monitor, said method comprising:
providing a housing having a first portion connected to the stationary element and a second portion connected to the rotating element, the housing defining a circumferential channel;
passing a cable through the housing, the cable including the at least one wire, the cable defining a 180° bend within the circumferential channel; and
as the rotating element rotates, coiling the cable within one of the first portion of the housing and the second portion of the housing and simultaneously uncoiling the cable within the other of the first portion of the housing and the second portion of the housing.

* * * * *

UNITED STATES PATENT AND TRADEMARK OFFICE
CERTIFICATE OF CORRECTION

| | | |
|---|---|---|
| PATENT NO. | : 7,147,062 B2 | Page 1 of 1 |
| APPLICATION NO. | : 11/090726 | |
| DATED | : December 12, 2006 | |
| INVENTOR(S) | : Kolacz et al. | |

It is certified that error appears in the above-identified patent and that said Letters Patent is hereby corrected as shown below:

In the SUMMARY OF THE INVENTION:
(Column 3, line 64): replace "4500" with --450°--

In the DESCRIPTION OF THE FIGURES:
(Column 6, line 8): replace "1800" with --180°--
(Column 6, line 10): replace "300" with --300°--
(Column 6, line 11): replace "750" with --750°--
(Column 6, line 64): replace "4500" with --450°--

In the Claims:
Claim 1, line 28: insert the – --of the at least one wire-- after the "portion"
Claim 1, line 29: insert the – --of the at least one wire-- after "portion"

Signed and Sealed this

First Day of May, 2007

JON W. DUDAS
*Director of the United States Patent and Trademark Office*